(12) United States Patent
Longoni et al.

(10) Patent No.: US 7,085,294 B2
(45) Date of Patent: Aug. 1, 2006

(54) FRAME SYNCHRONIZATION MECHANISM

(75) Inventors: Fabio Longoni, Arese (IT); Jukka Vialén, Espoo (FI); Valtteri Niemi, Helsinki (FI); Jukka Ranta, Turku (FI)

(73) Assignee: Nokia Networks Oy, Espoo (FI)

( * ) Notice: Subject to any disclaimer, the term of this patent is extended or adjusted under 35 U.S.C. 154(b) by 1022 days.

(21) Appl. No.: 09/847,580

(22) Filed: May 3, 2001

(65) Prior Publication Data

US 2001/0046240 A1 Nov. 29, 2001

Related U.S. Application Data

(63) Continuation of application No. PCT/FI99/00926, filed on Nov. 5, 1999.

(30) Foreign Application Priority Data

| Nov. 5, 1998 | (FI) | ................................................. 982399 |
| Mar. 8, 1999 | (FI) | ................................................. 990499 |
| May 25, 1999 | (FI) | ................................................. 991184 |

(51) Int. Cl.
*H04J 3/06* (2006.01)

(52) U.S. Cl. ...................................... 370/509; 370/516
(58) Field of Classification Search ................. 370/252, 370/503, 516, 519, 331, 350, 509, 510, 518, 370/507; 379/356, 358; 455/436
See application file for complete search history.

(56) References Cited

U.S. PATENT DOCUMENTS

| 5,237,612 | A | | 8/1993 | Raith |  |
| 5,627,830 | A | * | 5/1997 | Kotzin | 370/336 |
| 5,822,314 | A | * | 10/1998 | Chater-Lea | 370/337 |
| 5,872,820 | A | * | 2/1999 | Upadrasta | 375/356 |
| 6,449,290 | B1 | * | 9/2002 | Willars et al. | 370/507 |
| 6,470,185 | B1 | * | 10/2002 | Kangas et al. | 455/456.1 |
| 6,522,887 | B1 | * | 2/2003 | Larsson et al. | 455/456.5 |
| 6,529,497 | B1 | * | 3/2003 | Hjelm et al. | 370/347 |
| 6,577,872 | B1 | * | 6/2003 | Lundh et al. | 455/502 |
| 6,591,104 | B1 | * | 7/2003 | Ohtani et al. | 455/436 |
| 6,711,149 | B1 | * | 3/2004 | Yano et al. | 370/342 |
| 6,765,885 | B1 | * | 7/2004 | Jiang et al. | 370/328 |

FOREIGN PATENT DOCUMENTS

| WO | WO 98/08899 | 3/1995 |
| WO | 896 442 | 12/1997 |
| WO | WO 97/47111 | 12/1997 |
| WO | WO 98/57450 | 12/1998 |

* cited by examiner

*Primary Examiner*—Andy Lee
(74) *Attorney, Agent, or Firm*—Pillsbury Winthrop Shaw Pittman LLP

(57) ABSTRACT

A mechanism for synchronizing transmission of frames in a telecommunications network including a mobile station, a radio network controller, at least one base station. The mobile station and each base station have a corresponding timing reference. The mechanism includes or performs the steps of establishing a connection-specific timing reference which is common to all nodes involved in the connection; determining, for the base stations an offset between the timing reference of the base station in question and the CFN; and using the offset in the base stations, to compensate for the difference between the timing references.

24 Claims, 2 Drawing Sheets

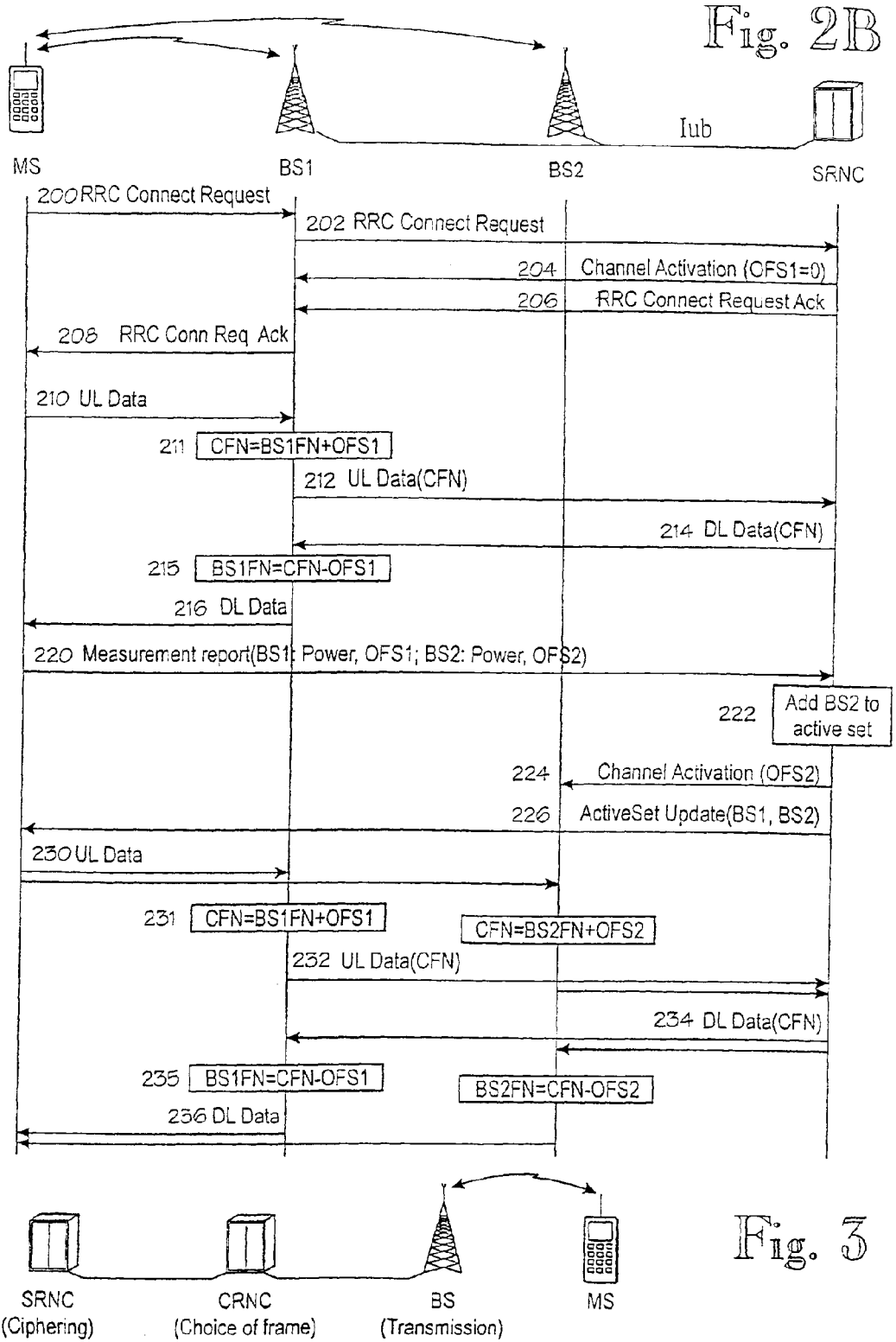

FRAME SYNCHRONIZATION MECHANISM

This is a Continuation of International Application PCT/FI99/00926 filed on Nov. 5, 1999 which designated the U.S.

BACKGROUND OF THE INVENTION

The invention relates to methods and equipment for synchronization of frames which are transmitted over multiple parallel transmission paths in a telecommunications network.

FIG. 1A illustrates a telecommunications network to which the invention is applicable. The telecommunications network could be e.g. a so-called third generation cellular mobile network, such as UMTS (Universal Mobile Telecommunications System). The telecommunications network comprises a first end node, such as a mobile station MS, and a second end node, such as a Radio Network Controller RNC1, RNC2. The network also comprises several middle nodes, such as Base Stations BS1 to BS4. Information to be sent between the end nodes is formatted as frames and at least some frames are sent between the end nodes via at least two middle nodes. The first middle node via which a connection between the end nodes is established is called a first middle node. The other middle nodes, which are added later to the connection, are called second middle nodes. In cellular network technology, the technique of routing frames via several middle nodes is called macrodiversity, diversity combining or soft handover.

FIG. 1B illustrates a problem associated with the system as shown in FIG. 1A. From this point on, the invention will be described using concepts and terminology from cellular networks, especially UMTS, but it should be kept in mind that the invention is applicable to other telecommunications networks where the middle nodes (the base stations) are not synchronized with each other and/or the end nodes (MS, RNC). In other words, the different nodes do not use a common timing reference and/or frame numbering sequence. However, recent UMTS literature favours the term User Equipment (UE), but in this application, the term Mobile Station (MS) will be used.

According to the current vision of UMTS, some traffic overhead is eliminated by not transmitting frame numbers with the frames (i.e. on a traffic channel) over the radio interface Uu. Instead, in the BS to MS direction, the frame numbers are broadcast to all mobile stations simultaneously, and in the BS to RNC direction, the base stations add the frame numbers in a modulo-p sequence where the currently proposed value for p is 72. In other words, the frame numbers repeat cyclically: 0, 1, . . . , 71, 0, 1, etc. The base stations are not synchronized with each other. Therefore, the frame numbers are relative and, indeed as such, they are meaningless without at least implicit information about the timing reference on which the frame numbers are based. Depending on the point of view, the frame numbers are called MSFN, BS1FN, BS2FN, etc. In FIG. 1B, time advances from top to bottom. At time T0, the Mobile Station MS receives a frame which the MS interprets as frame number N. Because the mobile station's timing reference, i.e. its clock, is the master timing reference, the RNC must have sent this frame sometime before T0. This "sometime" is called Timing Difference Tdiff and it is due to the finite propagation and processing delays between the RNC and the MS. (The concept of the transmission delay is somewhat analogous to the timing advance in the GSM system, but in the GSM, the timing advance of the MS is adjusted.)

At time T0, the MS also sends an uplink frame to the RNC. This uplink frame is also numbered N because the frame numbering is based on the mobile station's timing reference. Under each node (MS, BS1, BS2) is shown the corresponding timing reference, or frame numbering sequence (MSFN, BS1FN, BS2FN). Approximately at time T0+Tdiff, the RNC receives the frame N via two base stations, BS1 and BS2. Because the frame number is not transmitted over the radio interface, and because the base stations use different timing references, the BS1 sends this frame to the RNG as frame N', whereas BS2 would send the same frame as frame N". The RNC does not have an intrinsic timing reference.

Although the first problem is most severe in a system using macrodiversity, the underlying problem of BS/RNC synchronization also occurs without macrodiversity.

A second problem is that in some telecommunications systems, such as UMTS, the connection can be reconfigured, e.g. for negotiating a different data rate. Such reconfiguration must take place simultaneously at all nodes involved in the connection.

A third problem is that in systems using encryption, the frame number is often used as a constantly varying cipher key. However, a modulo-72 frame number is too short for reliable ciphering.

DISCLOSURE OF THE INVENTION

An intermediate object of the invention is to provide a mechanism for solving at least the first problem above, i.e. MS/BS1RNC synchronization. A final object is to solve also the other two problems relating to simultaneous reconfiguration and ciphering.

The intermediate object is achieved with a method and the equipment which are characterized by what is disclosed in the attached independent claims. Preferred embodiments for solving the other two problems are disclosed in the attached dependent claims.

The invention is based on locating a novel problem (in existing macrodiversity implementations, the base stations are synchronized and the problem does not exist). The invention is also based on an idea which can be implemented as a method comprising the steps of: (1) establishing a connection-specific timing reference (called CFN) which is common to all nodes involved in the connection; (2) determining, for at least one base station, an offset which is related to the difference between the timing reference of the base station in question and the CFN; and (3) using the information about the offset to compensate for the difference between the timing references.

According to the invention, it is proposed that the Mobile Station MS and the Serving Radio Network Controller SRNC must agree on a common timing reference which comprises at least a common frame numbering scheme. Within the context of this application, 'common' means common to the connection between the MS, the SRNC and the intervening base station(s). Such a common frame numbering scheme is called Connection Frame Number CFN.

According to a preferred embodiment of the invention, the offset is used by at least one base station, for synchronizing its timing reference to that of the RNC.

Using the common frame numbering scheme, i.e. the CFN, means that when the SRNC decides to send data to a Mobile Station MS, it marks the frame with a frame number X. When the Mobile Station receives the frame, it identifies the frame as frame X. However, the actual frame number is not transmitted on the traffic channel, and correspondingly, the common frame numbering scheme must be agreed on while establishing a connection. In other words, the MS and the SRNC must synchronize their frame numbering schemes at the beginning of the MS activity. In other words, MS and the SRNC must synchronize with each other during the exchange of the first few messages of the connection. The MS/RNC synchronization can be based on a separate synchronization message, if desired, but a separate message for this purpose is superfluous if the following mechanism is used: The first message which the MS sends is typically a CONNECTION REQUEST message. It comprises the measurement of the cells which the MS proposes to include in its active set, i.e. its set of active cells/base stations. According to the invention, the initial message also comprises information concerning the difference between the timing references of the various base stations. The difference between the MS's timing reference and that of base station number n will be called OFSn. It is measured for each base station monitored by the MS.

The SRNC determines the common reference from the point of time when it receives the initial CONNECTION REQUEST from the MS. When the SRNC orders the base station(s) to establish dedicated channels for the MS, the SRNC also sends to the base station the corresponding BS-specific offset OFSn. In every downlink frame, the SRNC includes a frame number according to the common frame numbering scheme. For each frame, this number is the same for all base stations. For transmission over the radio interface, each base station uses its own base station-specific offset OFSn to map the common frame number to the base station's own numbering scheme. After this frame number mapping, the BS can send the frame at the correct point of time. The base stations also perform reverse mapping in the uplink direction, whereby the diversity combining unit in the SRNC is able to combine frames having a common frame number.

The common frame number is also the timing reference used for RRC (Radio Resource Control protocol) messages, e.g. handover commands from the SRNC to the MS.

According to one embodiment of the invention, one base station, preferably the first one involved in the connection, does not have to compensate for the difference between the timing references. In other words, the other base station' timing reference is offset to match that of the first base station. According to a preferred embodiment of the invention, the frame number FN comprises two parts. One part, forming the least significant bits of the FN, is the known modulo-72 CFN. The other part, forming the most significant bits of the FN, can be called a Hyper Frame Number, HFN. Preferably, the combined length of the FN (=CFN+HFN) is at least 32 bits. This embodiment solves the third problem relating to encryption.

When the MS sends its initial CONNECTION REQUEST message, it can set the CFN to the BS1FN of the RACH frame in which the message was successfully sent. (A preferred initialization value for the HFN will be presented later.) The SRNC receives the message in a FCL (FRAME CONTROL LAYER) frame containing also the BS1FN (=CFN), and it can initialize the MSFN to a correct value. The MSFN (for that specific MS) stored in the SRNC is incremented every 10 ms, even if no uplink frames are received. In practice, however, it is sufficient to increment only the HFN every 720 ms, because the CFN is included in every uplink FCL frame. It is possible to eliminate a MS-specific HFN counter by 1) storing only an initial value for each MS, and 2) for each frame, adding to the initial value the number of completed CFN periods (at 720 ms each) from the establishment of the connection, i.e. from the time when the HFN was initialized.

Since the MS's timing reference is the master, the MS is at liberty to choose any value for the initial value of the CFN and/or the HFN. Such a degree of freedom can be used to improve the ciphering security. Instead of rigidly setting the CFN and/or the HFN on the basis of the time of the CONNECTION REQUEST message, this point of time could be used as a seed number to a secret algorithm, for providing an initial value for ciphering such that the initial value is unobtainable to an eavesdropper.

For ciphering, the parties should: 1) initialize the seed number (the CFN and/or the HFN) and 2) avoid using the same seed number twice or more times within a short period of time. Reusing the same seed number could weaken the ciphering security. For example, let us assume that the mobile station uses the same ciphering key Kc in two subsequent RRC connections. If in both connections the HFN is inibalized to zero, the same input to the ciphering algorithm (FN and KC) is used twice and the same ciphering mask is used in a relatively short period of time. This may occur also with random initialization.

i According to a further preferred embodiment of the invention, ciphering security is improved as follows. When the RRC connection is released, the mobile station stores the last HFN which was used (or some other information from which the last used HFN can be determined). The MS may prevent the reuse of the same ciphering key by storing the last used HFN in its SIM card, for example. In UMTS system the SIM is replaced by USIM. At a new RRC connection setup, the MS initializes the HFN to a value which is higher than the last used HFN and transmits this value to the SRNC, preferably in an RRC CONNECTION SETUP REQUEST message. This HFN value will be used as a reference for initializing the HFN at the SRNC. Optimally, the next HFN is the last used HFN plus one. This ensures that there is a maximum period of time until the same ciphering key will be reused. It should be noted that the RRC CONNECTION SETUP REQUEST is only one possible message for sending the initialization value for the HFN. This value can be sent in any message, at any point of time, until ciphering is started.

In order to minimise the length of the RRC connection setup message, it should be possible to transmit only the most significant bits of the HFN (the least significant bits having a default state, e.g. zeros). The number of bits used for the initialization on the HFN depends on the number of times the same ciphering key can be reused when a new RRC connection is set up. Eight bits is probably a sufficient number for the transmitted most significant bits of the HFN.

Before ciphering is started, (e.g. when establishing a new RRC connection), the HFN should be initialized to a value which is higher than the last used value HFN. This can be ensured as follows. When an RRC connection is released, the MS stores the value of the last used HFN, preferably in its SIM card. When the next RRC connection is established, the value is read from the SIM card and incremented by one. Incrementing by one ensures that there is a maximum period of time until the same ciphering key will be used again. Naturally, the incrementing step can be performed before storing.

Some memory can be saved by storing only the most significant bits of the HFN (which can be incremented before or after storing).

The HFN between the MS and the UTRAN (UMTS Radio Access Network) can be synchronized by sending the HFN (or its most significant bits) from the MS to the network on a RACH channel in an RRC CONNECTION SETUP REQUEST message. Alternatively, the MS could send the HFN (or its most significant bits) to the UTRAN: 1) using a dedicated channel; 2) during an authentication procedure; or 3) in a CIPHERING MODE COMPLETE message. If the network has information of the last HFN used (e.g. in an RRC connection re-establishment procedure), the RNC can initialize the HFN.

In the case of a GSM to UMTS handover, a suitable message is HANDOVER COMPLETE. Alternatively, the MS could send the HFN (or its most significant bits) to the GSM network which forwards it/them to the UMTS network.

There still exists a potential security risk. This risk may arise in a situation where a mobile station's power supply (battery) fails during a call. When the battery is recharged or replaced, and a new connection is established, the HFN (or its MSB part) will be read from the SIM card and sent to the network. However, if the battery fails and the mobile station does not have time to store the last used HFN, the new connection (after recharging/replacing the battery) will use the "old" HFN. As a result, the new connection will use the same frame numbers as the previous connection did, which weakens security.

Accordingly, it is preferable to implement the following feature: when the last used HFN number is read from the SIM card, it is marked "old" (or "used"). At the end of the connection, when the last used HFN number is written to the SIM card, it is marked "new" (or "unused"). If the last used HFN cannot be properly updated to the SIM card (e.g. due to battery failure), the mobile station will retrieve an "old" HFN number (or its MSB part). In this case, the mobile station has at least two options.

According to a first option, the MS can choose a random number for the HFN. This random number should be significantly higher than the last used HFN, such that it is highly unlikely that the sequence or frame numbers will be repeated. This could be enforced if the MS updates the HFN to the SIM every L hyperframes and marks the recently updated HFN as "old". If the battery fails, the HFN for the next connection will be set to the "old" HFN (stored in the SIM card+L+1. This value should be immediately updated to the SIM card and marked as "old". (Of course, because the HFN has a finite length, "higher" should be interpreted in a modulo fashion).

According to a second option, the MS can inform the network that the MS has a bad HFN and request a new ciphering key Kc. When the Kc has been exchanged, it does not matter which HFN will be used for the first connection with the new Kc.

Some ciphering concepts cannot utilize the CFN for the ciphering counter. This is the case if ciphering needs to be performed on protocol layer that does not have direct control of the CFN, e.g. on the RLC (Radio Link Control) layer. In this case, the same HFN can still be used to initialize the ciphering counter, but after initialization, the ciphering counter is not incremented together with CFN, but by some other means, e.g. by following RLC PDU numbers. The RLC PDU number normally has—like the CFN—a finite length such that the RLC PDU number has a period which is substantially shorter than the duration of a typical connection. In some ciphering concepts it is even possible that ciphering is done on more than one protocol layer, e.g. on the RLC layer for all non-transparent services and on the MAC layer for all services using transparent RLC. In this case, the ciphering on the MAC layer can use the HFN+CFN as a ciphering sequence number, whereas the ciphering on RLC layer should use the HFN+RLC PDU number as the sequence number input for the ciphering algorithm.

In case that the ciphering cannot utilize CFN, e.g. on the RLC layer, further problems arise from the possibility to have several parallel services (radio access bearers), each using its own RLC entity, thus each having an independent RLC PDU number sequence. In practise this means that each service (radio access bearer) has its own ciphering sequence number. Two problems need to be solved: 1) which HFN value to use for services (radio access bearers) that are added to the connection when ciphering for some other bearers is already active?; and 2) which HFN to store to the SIM (or to any non-volatile memory) after an RRC Connection release, if each service has its own ciphering counter?

For the problem 1), two potential solutions exist. According to the first solution, the HFN for a new radio access bearer is read from the SIM card (just like in the RRC Connection setup). According to the second solution, the HFN for a new radio access bearer will be based on the highest HFN used during the connection. It can be set either to the same value as the highest used HFN or e.g. highest used HFN incremented by some integer value, preferably by one.

For the problem 2), a solution is to keep record of the greatest HFN in use at any time instant. When the RRC Connection is released (of after every L hyperframes), the highest HFN used is stored to the SIM card, as described above. The record-keeping can be implemented e.g. in a protocol management entity that can monitor all the parallel ciphering processes.

It should be noted that in case of parallel ciphering counters running independently of each other, the actual security problem is not solved, since the same ciphering counter value may appear within very short time period (in different services). Furthermore, since in case of the RLC PDU number-based ciphering, the PDU number must be included unciphered in the transmission, it is easy for an eavesdropper to follow the ciphering counters. The security problem (avoid producing the same ciphering mask within too short a period) can be solved by a) including a bearer (or logical channel)-specific input (e.g. a bearer id number) to the ciphering algorithm inputs (this is disclosed in Finnish patent application 990500) or b) by using a different Kc or a different ciphering algorithm for each parallel radio access bearer (this is disclosed in Finnish patent application 980209). It should be noted that use of the SIM card has been given only as an example. Any non-volatile memory will do. However, storing the HFN in the SIM may be preferable, considering a case where the MS user moves the SIM card to another terminal. According to yet another preferred embodiment of the invention, the frame number offsets OFSn are not integer numbers but have a higher resolution. The fractional part of the OFS is called a Symbol Offset, SOF, and its resolution preferably matches one symbol or chip, if required by Layer 1 synchronization in a soft handover procedure. Alternatively, the OFS and SOF can be stored as separate parameters.

The offsets can be updated in every measurement report. The mobile station can compare at any time its own timing reference with that of the base stations.

If the invention is used in a telecommunications system where the UTMS terminology is not applicable, the Mobile Station MS and Radio Network Controller RNC can be called a first end node and a second end node, respectively. Correspondingly, the Base Stations BS can be called middle nodes. The first middle node (BS), via which the connection is established, is called a first middle node. The other middle nodes, which will be added later, are called second middle nodes.

BRIEF DESCRIPTION OF THE DRAWINGS

The invention will be described in more detail by means of preferred embodiments with reference to the appended drawing wherein:

FIG. 2B is a signalling diagram illustrating the operation of a preferred embodiment of the invention; and FIG. 3 shows a case where a middle node is a controlling RNC.

DETAILED DESCRIPTION OF THE INVENTION

Figure 2A:
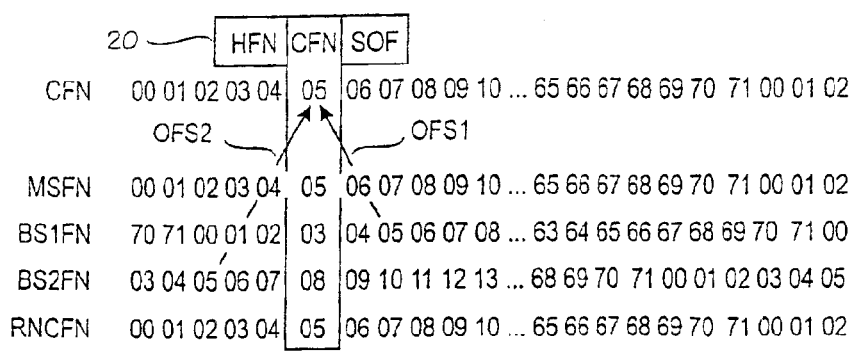
FIG. 2A illustrates the concept of the invention.

FIG. 2A illustrates the concept of the invention. According to the invention, there is defined a connection-specific timing reference which is marked with reference number 20. The connection-specific timing reference 20 comprises a connection-specific frame number CFN and, preferably, an extension part called Hyper Frame Number HFN and a fractional offset part SOF.

Figure 1A:
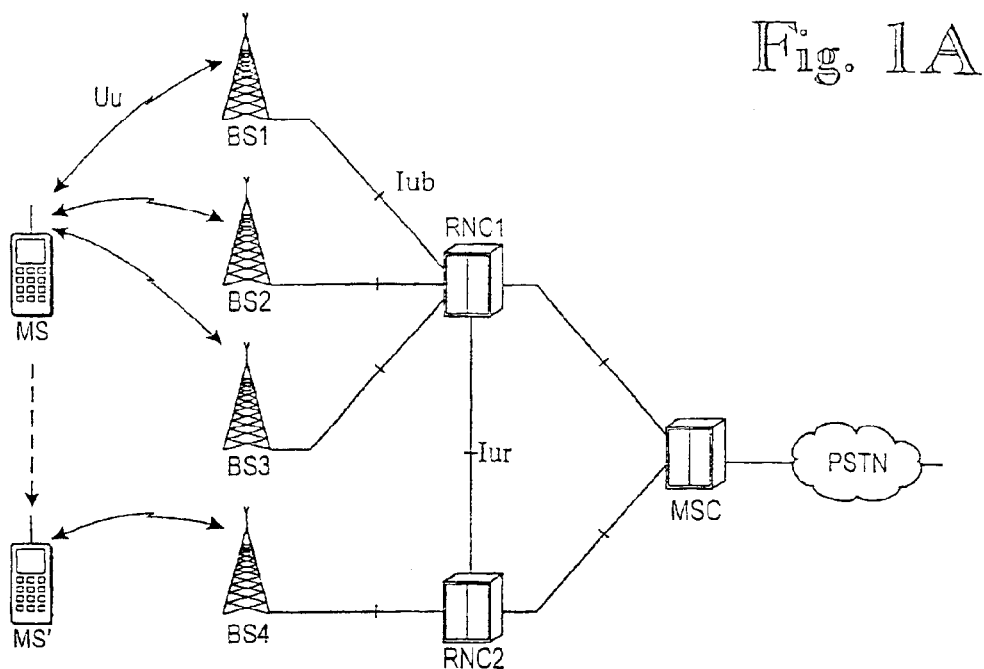
FIG. 1A is a block diagram illustrating a cellular telecommunications network.
Figure 1B:
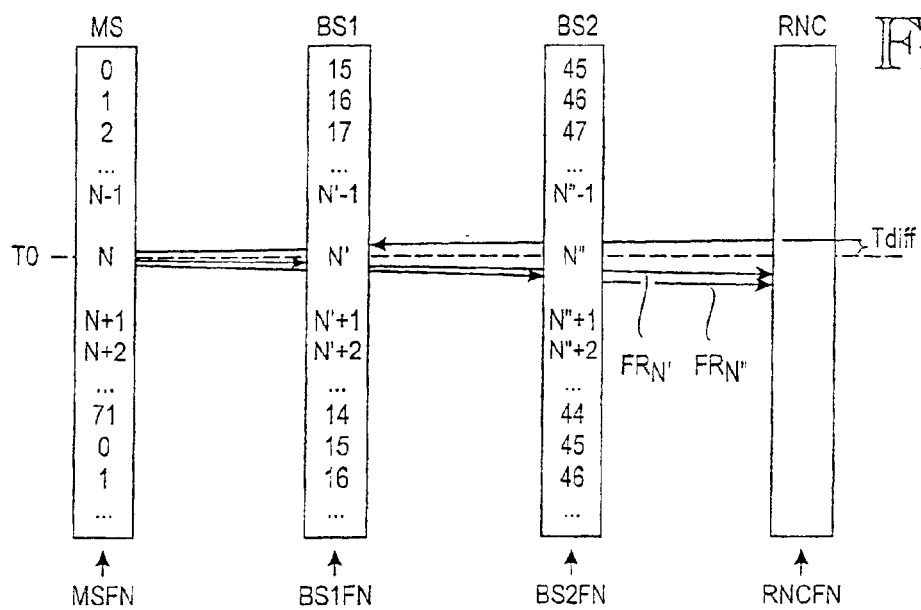
FIG. 1B illustrates certain problems related to the invention.

Basically, the connection-specific frame number CFN is maintained like any other frame number in FIG. 1B. In other words, it is stepped (incremented) from zero in a modulo-p manner, where p is the period of the counter, such as 72. A similar frame number counter is maintained for all the nodes involved in the connection. The only difference between the counters is the offset between them. In FIG. 2A, the Mobile Station MS and the RNC synchronize their frame numbers MSFN, RNCFN to the connection-specific frame number CFN. In regard to the CFN, Base Station BS1 has a BS-specific offset BS1 of +2, because 2 must be added to BS1's frame number BS1FN for obtaining the connection-specific frame number CFN. (Whether such an offset is called positive or negative is only a matter of naming convention.) Correspondingly, Base Station BS2 has a BS-specific offset BS2=−3. (In FIG. 2A, such small offsets have been chosen for clarity. In reality, the offsets can have any values between 0 and 71.) According to the invention, these BS-specific offsets must be determined and conveyed to the base station in question, whereby each base station can use the offset for compensating for the difference between its own timing reference (i.e. its frame numbering) and the connection-specific timing reference 20.

The vertical box labelled CFN indicates the frame numbers at various points in the network. At the time shown, the connection-specific timing reference 20 has a frame number CFN=5, which is also true for the MS and the RNC. The BS-specific frame number of BS1 is 3 and that of BS2 is 8. Because the MS, being the master, is at liberty to choose any timing reference, and because the RNC has to synchronize its frame numbering with that of the MS, the MS and the RNC might as well synchronize their frame numbering schemes with that of BS1, which is the first base station involved in the connection. This means that the offset for BS1, i.e. OFS1, is zero. (However, the benefit of a zero offset is slight, considering that it is probably easier for BS1 simply to add the offset rather than first check whether its offset is non-zero, and perform the addition if the offset is non-zero.)

The connection-specific timing reference 20 should also comprise an extension part, which is called a Hyper Frame Number HFN. It is stepped (incremented) each time the CFN completes a period, such as every 720 ms. The bit length of HFN should be rather high for two reasons. First, the HFN/CFN combination should be unambiguous during a connection. Second, the HFN/CFN combination could be used as a ciphering/deciphering key. A suitable length for a ciphering/deciphering key is approximately 32 bits, whereby the HFN is approximately 25 bits. With such a bit length, the HFN/CFN combination is unambiguous during a connection lasting up to a year.

Preferably, the connection-specific timing reference 20 also comprises a fractional offset part SOF which is used to compensate for the propagation delay Tdiff shown in FIG. 1B.

It should be noted that term 'frame number' can be somewhat misleading. The frame numbers are not used for counting actual user frames. Instead, the base stations use the frame numbers for numbering (marking) uplink frames which are sent at a given point of time. They also use the frame numbers for determining the point of time when a downlink frame with a given frame number should be sent. For example, assuming that the CFN is incremented every 10 ms and it has a period of 72 steps (720 ms), an uplink frame sent 1 second (1000 ms=100*10 ms) after establishing the connection has a HFN of 1 and a CFN of 28 (=100 mod 72). Correspondingly, a downlink frame with a frame number of 28 must be sent 280+n*720 ms after establishing the connection. In order to maintain synchronization, dummy frames can be sent between the RNC and the BS if there is no user data to be sent.

As stated above, according to a preferred embodiment of the invention, the last used HFN is stored in the mobile station's SIM card after releasing an RRC connection. When the next new RRC connection is being established, the MS sends the SRNC an initialization value, on the basis of which the SRNC initializes the HFN to a value which is higher than the last used HFN. Since the HFN has a finite length, "higher" should be interpreted in a modulo fashion. For example, let us assume a length of 25 bits for the HFN. Some memory can be saved and the connection establishment messages can be shortened by storing and sending only the most significant bits of the HFN. The MS could only store eight most significant bits. Let us call these 8 bits the MSB part of the HFN. In the next connection establishment, the 17 least significant bits (the LSB part) will not be known. However, if the MSB part is incremented by one (between two consecutive RRC connections), the first HFN of the new connection will certainly be higher than the last HFN of the previous connection. An identical result is achieved if the LSB part is assumed to be all ones and the entire HFN (not just the MSB part) is incremented by one.

FIG. 2B is a signalling diagram illustrating the operation of the preferred embodiment of the invention. At step 200, the MS initiates a connection by sending a message called RRC_CONNECTION_REQUEST (RRC=Radio Resource Control protocol). This message contains the measurements of the base stations which the MS proposes to be included in its active set. The measurements comprise the apparent power and the timing reference (a frame number offset) of each base station. At step 202, the connection request is conveyed to the serving Radio Network Controller SRNC. At step 204, the SRNC sends a CHANNEL ACTIVATION command to BS1. This message includes the frame numbering offset value for BS1, i.e. OFS1. However, since BS1 is the first base station involved in the connection, its offset value OFS1 can be set to zero, because it is not necessary to synchronize the frame numbers of the base stations to an absolute timing reference. Instead, it is sufficient to synchronize the frame numbers of the various base stations with each other. (Next, BS1 sends an acknowledgement to SRNC, but it is irrelevant for understanding the invention.) At steps 206–208, a CONNECTION_REQUEST_ACK is sent via BS1 to the MS. Now, a connection has been established between the MS and the SRNC.

At step 210, the MS sends its first uplink frame. At step 211, BS1 calculates the Connection Frame Number CFN, based on the point of time when it receives the frame. BS1 also adds its frame numbering offset OFS1 to the CFN, but OFS1 was set to zero and the CFN does not change. At step 212, BS1 sends this frame to the SRNC. Steps 214–216 depict the corresponding steps for sending downlink data.

The MS must constantly monitor its neighbouring base stations. At step 220, it sends the SRNC a MEASUREMENT REPORT which (in this example) comprises measurement data for BS1 and BS2. The measurement data comprises measured power and the frame number offset of BS1 and BS2. At step 222, the SRNC decides that the MS receives BS2 strongly enough for adding BS2 into the MS's active set. At step 224, the SRNC sends BS2 a CHANNEL ACTIVATION command which comprises the frame numbering offset OFS2 for BS2. At step 226, the SRNC sends the MS an ACTIVE SET UPDATE message which commands the MS to include BS2 in its active set. (The ACTIVE SET UPDATE message is somewhat analogous to a handover message, but the current base station(s) is/are not necessarily abandoned.)

At step 230, the MS sends another uplink data frame. This time, the frame is relayed to base stations BS1 and BS2. At step 231, each base station determines its Base Station-specific Frame Number BS1FN, BS2FN, based on the point of time when it receives the frame, and adds its own frame numbering offset OFSn to the BSnFN (n={0, 1}). The sum of these OFSn and BSnFN is the Connection Frame Number CFN. The CFN has no base station specific index because it is the same at both/all base stations of the connection. At step 232, BS1 and BS2 send the uplink frame to the SRNC, the combining unit of which can correctly combine the frames because the CFN is the same in both frames.

The actual combining step can be based on known macrodiversity techniques. Each frame may contain measurement results, such as a Bit Error Ratio BER or a Received Signal Strength Indication RSSI, and of similarly numbered frames, the combining unit can choose the one that has the best measurement result.

Steps 234 to 236 depict sending downlink data to the mobile station MS. At step 234, the SRNC sends a downlink data frame having a connection frame number CFN to both/all base stations which are included in the mobile station's active set. At the SRNC, the CFN of the downlink frames is determined on the basis of the point of time when the SRNC sends the downlink frame. At step 235, the base stations BS1 and BS2 use the CFN for determining the point of time when they must send the downlink frame to the mobile station. In FIG. 2B, this calculation of time is shown as a step of subtracting the base station specific offset OFSn from the connection frame number CFN, the result being the basestation specific frame number BSnFN, which has a well-defined relationship to the point of time when the frame must be sent to the MS. As has been described, the BSFN specifies the time within a 720-ms cycle. In addition to knowing the BSFN, the base station must maintain the Hyper Frame Number HFN which specifies the most significant bits of the time. Next, at step 236, the base stations BS1 and BS2 send the downlink data frame to the mobile station MS. The different base station specific offsets OFSn compensate for the difference between the timing references of the base stations, and they send the frame at the correct point of time.

In FIG. 2B, uplink and downlink frames are sent individually. However, in practice, several frames (e.g. 4) are combined into one Transport Block Set TBS for improving ciphering security and immunity against transmission errors. Instead of including the CFN and/or timing adjustment information in each frame, it is sufficient to include such information in each TBS.

Layer 1 Symbol Synchronization

In the current vision of UMTS, downlink Layer 1 data to be combined must be received with a timing difference which is less than one symbol period. In order to achieve such sub-symbol-period synchronization, a procedure analogous to determining the frame number offsets can be applied. The MS measures the symbol offset SOFn of candidate cells/base stations. The SOF is measured as the difference between the MS-specific required frame timing and the BS's downlink perch (broadcast) channel frame timing, and it is included in the measurement report. After deciding to add a new base station to the MS's active set, that BS's SOFn is conveyed to the BS in question in the channel activation message.

Due to frequency drifts, it may be necessary to update the SOF during a connection. In this case, the MS may measure/recalculate the SOF and report it in the measurement report. The expected rate for the SOF recalculation is in the order of once per 10 minutes.

Instead of using a separate frame number OFS and a symbol offset SOF, these two offsets can be combined to a float number, of which the integer part specifies the OFS and the decimal part specifies the SOF. SRNC relocation During a connection, the RNC serving the MS may change. In FIG. 1A, the broken arrow depicts the MS's movement to a cell served by BS4 which is under control of RNC2. Such a situation requires SRNC relocation. In a SRNC relocation process, the frame numbering system (i.e. the MSFN) must be preserved. The CFN part can be maintained in the new SRNC because of uplink FCL frames. However, the HFN should be transferred to the new SRNC over the Iur interface. The HFN can be transferred in an RNSAP SRNC relocation procedure. If the maximum transfer delay of the two messages via the core network exceeds the CFN period of 720 ms (this can happen especially if MAP-E is involved), some additional measures must be taken. For example, assuming that the old and new RNC are synchronized to a common time reference, it is sufficient to inform the new RNC about the point of time when the HFN was initialized.

Common Channel State

A MS may enter Common CHannel state (CCH) during a connection, when little data needs to be transferred between the MS and the SRNC. In common channel state, certain access channels, such as the Random Access Channel RACH and Forward Access Channel FACH channels are shared between several mobile stations. At any point of time, some of the mobile stations may use ciphering while some do not. In this case, the use of absolute frame number references is necessary only for ciphering purposes, because macrodiversity is not used. In other words, frames are sent between the MS and the RNC via only one base station, and the MS can be allowed to use the frame numbering of that base station. If the BS is changed due to handover, the CFN should be changed to that of the new BS.

On the RACH, the MSFN is used for ciphering data, although some RACH signalling messages (or at least parts of them) are sent unciphered. On the FACH (or any downlink common channel, such as Downlink Shared Channel, DSCH), the MSFN is used for scheduling and retransmission in the SRNC. The MAC layer knows the BSFN and/or the CFN and uses the MSFN for ciphering data on the FACH. Preferably, on all common channels, there should be an indication (e.g. on a MAC layer header) whether or not the packet in question is ciphered.

If the RNC is using a timing reference which was established before entering the CCH state, it may not know exactly the frame number which corresponds to the point of time when the BS will send a downlink frame to the MS. This makes frame-number-based ciphering/deciphering virtually impossible because the MS may receive the frame at a point of time which corresponds to a frame number different from the frame number which the RNC used for ciphering. Accordingly, it is proposed that at least in a case where the BS cannot send a frame at a point of time which corresponds to a frame number indicated by the RNC, the BS sends the frame to the MS and provides it with an appropriate correction field. For instance, if the CFN indicated by the RNC is 36 and the BS sends the frame at a point of time which corresponds to a CFN of 38, the BS should indicate to the MS that the frame was delayed by an amount of time which corresponds to two frame numbers.

Such a correction field could be limited to non-negative values. This means that if the frame number is not what the RNC indicated, the frame is delayed. If the frame number indicated by the RNC is too high, the BS could correct the problem by delaying the frame.

Using an appropriate correction field is also applicable in a case where a Controlling RNC (CRNC, the RNC controlling a BS) decides which radio frame shall be used for transmission, but the ciphering has already been performed by a Serving RNC (SRNC). Such a situation is shown in FIG. 3. In this case the CRNC is the middle node according to the invention.

Alternatively, sending the correction field could be avoided if the ciphering/deciphering algorithm is such that the MS can figure out whether or not a frame can be correctly deciphered (e.g. by providing a meaningless result if not). In this case the MS may, upon encountering an incorrect deciphering result, decipher the frame using the key which corresponds to a few previous frames.

Changes to UMTS Proposals

If the invention is applied to a cellular telecommunications network, such as UMTS, some changes to current standard proposals will be needed. The RRC protocol should be extended for conveying the base station-specific offsets (OFS, and preferably, SOF for L1 timing) in the MEASUREMENT REPORT for the candidate cells. For some base stations these measurement values change very slowly or, for practical purposes, they do not change at all, and thus some overhead can be eliminated by sending the offsets only as necessary.

The FCL protocol should include the CFN in every uplink and downlink frame. For maintaining synchronization, uplink frames should be sent regularly, even if there is no data to be sent (DTX). Dummy frames can be used for initial synchronization. One or more time adjustment bits can be included in the FCL header. The format of the header can be bearer-specific.

The BSAP protocol should include the OFS/SOF in the CHANNEL ACTIVATION message and in the CHANNEL MODIFICATION message, if used. A new message/procedure, TRANSMISSION FAILURE/ERROR INDICATION should be defined for indicating that a base station has received a frame completely outside the time slot allocated to the frame.

The RNSAP protocol should include the OFS/SOF in the BRANCH ADDITION and BRANCH RECONFIGURATION messages. In a similar manner to the BSAP protocol, a new message/procedure, TRANSMISSION FAILURE/ERROR INDICATION should be defined.

The RANAP protocol should include the HFN (or the point of time when the HFN was initialized) in SRNC RELOCATION and SRNC RELOCATION REQUEST messages.

The Radio Network Controller RNC should include on the MAC layer a Hyper Frame Number HFN counter for each mobile station. Actually, an MS-specific counter is only needed as a logical concept. In practice, it is not necessary to establish a separate counter for each mobile station. Alternatively, for each mobile station, the RNC could store the point of time when the connection was established, and when the HFN number is needed, its initial value is retrieved and added to the current duration of connection (in units of 720 ms cycles). The HFN can be used as an input to the ciphering/deciphering algorithm. Preferably, the RNC should also store the SOF/Tdiff (see FIGS. 1B and 2A) for each mobile station and modify it according to the timing advance bits in FCL uplink frames. This information is used for setting the transmission time of the FCL downlink frames and for setting a switching time for operations involving L1/L2 reconfiguration.

The Base Stations BS should store, for each mobile station, the BS-specific frame numbering offset OFS (and a separate symbol offset SOF if it is not included in the OFS). The BS should include the CFN=BSFN+OFS in every uplink data frame and transmit the downlink data frames at the point of time which corresponds to BSFN=CFN−OFS. (In these additions and subtractions, the SOF is assumed to be included in the OFS.) Moreover, the base stations should set the timing adjustment bit(s) in uplink FCL frames.

The Mobile Station MS should initialize a MS-specific frame number MSFN and increment it every 10 ms. It should also measure the OFS and SOF of base stations within range (in addition to the prior art measurements), and report these offset parameters in its measurement reports.

For illustrating the invention, and for demonstrating its industrial applicability, the invention has been described in connection with a 3rd generation mobile telecommunications system, such as UMTS. However, the invention is applicable to other types of communications systems and, consequently, it is not limited to the embodiments described above.

Glossary (Some Acronyms are not Official):

BSn: Base Station number n
BSAP: BS Application Part protocol
BSnFN Frame Number used by Base Station number n
CCH: Common CHannel (state)
CFN: Connection Frame Number
DTX: Discontinuous Transmission
FACH: Forward Access Channel
FCL: Frame Control Layer (a frame transmission protocol)
HFN: Hyper Frame Number, extension of CFN
MAC: Medium Access Control
MS: Mobile Station, also called User Equipment (UE)
OFSn: Frame number offset of BS number n
RACH: Random Access Channel RANAP: RAN (Radio Access Network) Application Part
RNC: Radio Network Controller
RNSAP: Radio Network System Application Part (signalling protocol between 2 RNCs)
SOFn: Symbol Offset, can be presented as fractional part of OFSn
SRNC: Serving RNC
TBS: Transport Block Set
UMTS: Universal Mobile Telecommunications System

We claim:

1. A method for synchronizing transmission of frames in a telecommunications network comprising a first end node, a second end node, at least one middle node via which a connection is established between the end nodes, wherein each of the first end node and the at least one middle node has a timing reference;
the method comprising:
establishing a connection-specific timing reference which is common to all nodes involved in the connection;
determining, for at least one middle node an offset which is related to the difference between the timing reference of the middle node in question and the connection-specific timing reference; and
using the information about the offset to compensate for the difference between the timing references;
wherein the connection-specific timing reference comprises, at the end nodes, a connection-specific frame number, which is stepped at predetermined intervals and which has a finite length such that the connection-specific frame number has a period which is shorter than an average duration of a connection.

2. A method according to claim 1, wherein, in a case where a middle node can only send a frame at a point of time which is later than the time which corresponds to the connection-specific timing reference, the middle node in question provides the frame with a correction indicator, which indicates, directly or indirectly, the amount of time by which the frame was delayed.

3. A method according to claim 1, wherein the offset for the middle node in question also comprises a fractional offset part which approximately corresponds to the propagation delay of a frame between the end nodes.

4. A method according to claim 1, further comprising:
the first end node obtaining measurement results from the at least one middle node and sending the measurement results to the second end node; and
the second end node using the measurement results for determining the offset for the middle node in question.

5. A method for synchronizing transmission of frames in a telecommunications network comprising a first end node, a second end node, at least one middle node via which a connection is established between the end nodes, wherein each of the first end node and the at least one middle node has a timing reference, the method comprising:
establishing a connection-specific timing reference which is common to all nodes involved in the connection;
determining, for at least one middle node an offset which is related to the difference between the timing reference of the middle node in question and the connection-specific timing reference; and
using the information about the offset to compensate for the difference between the timing references,
wherein the connection-specific timing reference comprises, at the end nodes, a connection-specific frame number and a frame number extension which is stepped when the connection-specific frame number completes one period.

6. A method according to claim 5, further comprising the end nodes using the connection-specific frame number and the frame number extension for ciphering and deciphering the frames.

7. A method according to claim 5, further comprising the end nodes using the frame number extension and another sequence number for ciphering and deciphering the frames.

8. A method according to claim 7, wherein the other sequence number is a protocol data unit number.

9. A method according to claim 5, further comprising:
the end nodes employing ciphering in more than one protocol layer;
using the connection-specific frame number and the frame number extension for ciphering and deciphering the frames in a first layer, and
using the frame number extension and another sequence number for ciphering and deciphering the frames in another layer.

10. A method according to claim 5, further comprising:
the end nodes employing ciphering in more than one protocol layer or for two or more parallel bearers so that there are parallel ciphering counters running independently, and
using the frame number extension as an initialization parameter of the parallel ciphering counters.

11. A method according to claim 5, further comprising:
the first end node sending to the second end node an initialization parameter for the frame number extension, and
the second end node initializing, on the basis of the initialization parameter, the frame number extension to a value which exceeds the last value of the frame number extension during a previous connection.

12. A method according to claim 11, further comprising:
forming the initialization parameter of the last value of the frame number extension or of a number n of most significant bits in the last value of the frame number extension.

13. A method according to claim 11, further comprising:
the first end node sending the initialization parameter in response to a detected need for establishing, re-establishing or handing over a connection.

14. A method according to claim 11, further comprising:
the first end node sending the initialization parameter to the second end node in one or more of the following ways:
on a Random Access Channel;
on a dedicated channel;
in a message relating to an authentication procedure; or
in a Ciphering Mode Complete message.

15. A method according to claim 11, further comprising:
in case of a handover from a second generation mobile network to a third generation mobile network, the first end node sending the initialization parameter to the second end node in a Handover Complete message.

16. A method according to claim 11, further comprising:
in case of a handover from a second generation mobile network to a third generation mobile network, the first end node sending the initialization parameter to the second generation mobile network which forwards it to the second end node.

17. A method according to claim 11, further comprising:
at the end of a connection, the first end node storing into a memory a value which comprises information about the last or the biggest frame number extension used during the connection in question; and
at the beginning of the next connection, the first end node reading from the memory the value stored in the previous step and using the value for forming the initialization parameter.

18. A method according to claim 11, further comprising:
performing separate ciphering for at least two parallel bearers,
during the connection, the first end node reading from the memory the last or highest value of the frame number extension used during the previous connection and using the read value for forming the initialization parameter when a new bearer is to be added to the connection.

19. A method according to claim 11, further comprising:
performing separate ciphering for at least two parallel bearers,
the first end node recording the highest value of the frame number extension used during the connection and using the value for forming the initialization parameter when a new bearer is to be added to the connection.

20. A method according to claim 17, wherein the storing step comprises marking the stored value with an unused status and the reading step comprises marking the stored value with a used status.

21. A first end node for forming a connection to a second end node via at least one middle node in a telecommunications network, wherein each of the first end node and each middle node has a timing reference; wherein the first end node is adapted to co-operate with the second end node, for:
establishing a connection-specific timing reference which is common to all nodes involved in the connection, and
determining, at least for one middle node, an offset which is related to the difference between the timing reference of the middle node in question and the connection-specific timing reference;
wherein the connection-specific timing reference comprises:
a connection-specific frame number, the value of which is stepped at predetermined intervals and which has a finite length such that the connection-specific frame number has a period which is shorter than an average duration of a connection; and
a frame number extension which is stepped when the connection-specific frame number completes one period; and that
when a connection is being established, re-established or handed over, the first end node is adapted to send to the second end node an initialization parameter for the frame number extension, for initializing the frame number extension to a value which exceeds the last value of the frame number extension during a previous connection.

22. A method for synchronizing transmission of frames in a telecommunications network comprising a first end node, a second end node, at least one middle node via which a connection is established between the end nodes, wherein each of the first end node and the at least one middle node has a timing reference, the method comprising:
establishing a connection-specific timing reference which is common to all nodes involved in the connection;
determining, for at least one middle node an offset which is related to the difference between the timing reference of the middle node in question and the connection-specific timing reference; and
using the information about the offset to compensate for the difference between the timing references,
wherein the connection-specific timing reference comprises at the end nodes, a connection-specific frame number, which is stepped at predetermined intervals and which has a finite length such that the connection-specific frame number has a period which is shorter than an average duration of a connection; and a frame number extension, which is stepped when the connection-specific frame number completes one period.

23. A first end node for forming a connection to a second end node via at least one middle node in a telecommunications network, wherein each of the first end node and each middle node has a timing reference; wherein the first end node is adapted to co-operate with the second end node, for:
establishing a connection-specific timing reference which is common to all nodes involved in the connection, and
determining, at least for one middle node, an offset which is related to the difference between the timing reference of the middle node in question and the connection-specific timing reference,
wherein the connection-specific timing reference comprises a connection-specific frame number, the value of which is stepped at predetermined intervals and which has a finite length such that the connection-specific frame number has a period which is shorter than an average duration of a connection.

24. A first end node for forming a connection to a second end node via at least one middle node in a telecommunications network, wherein each of the first end node and each middle node has a timing reference; wherein the first end node is adapted to co-operate with the second end node, for:
establishing a connection-specific timing reference which is common to all nodes involved in the connection, and
determining, at least for one middle node, an offset which is related to the difference between the timing reference of the middle node in question and the connection-specific timing reference,
wherein the connection-specific timing reference comprises a connection-specific frame number and a frame number extension which is stepped when the connection-specific frame number completes one period, and, when a connection is being established, re-established or handed over, the first end node is adapted to send to the second end node an initialization parameter for the frame number extension, for initializing the frame number extension to a value which exceeds the last value of the frame number extension during a previous connection.

* * * * *